(12) United States Patent
Keel et al.

(10) Patent No.: US 12,472,675 B2
(45) Date of Patent: Nov. 18, 2025

(54) SOLENOID VALVE

(71) Applicant: Eugen Seitz AG, Wetzikon (CH)

(72) Inventors: Manuel Keel, Wildegg (CH); Marco Erni, Buttwil (CH)

(73) Assignee: Eugen Seitz AG, Wetzikon (CH)

( * ) Notice: Subject to any disclaimer, the term of this patent is extended or adjusted under 35 U.S.C. 154(b) by 281 days.

(21) Appl. No.: 18/118,928

(22) Filed: Mar. 8, 2023

(65) Prior Publication Data

US 2023/0286202 A1 Sep. 14, 2023

(30) Foreign Application Priority Data

Mar. 9, 2022 (EP) .................................... 22161193

(51) Int. Cl.
*B29C 49/42* (2006.01)
*G06K 19/07* (2006.01)
*G06K 19/077* (2006.01)
*H01Q 1/22* (2006.01)

(52) U.S. Cl.
CPC ...... *B29C 49/4289* (2013.01); *G06K 19/0724* (2013.01); *G06K 19/07779* (2013.01); *H01Q 1/2208* (2013.01)

(58) Field of Classification Search
CPC ............ B29C 49/4289; G06K 19/0724; G06K 19/07779; G06K 7/10316; G06K 19/0723; G06K 19/077; G06K 19/0717; G05B 2219/15004; G05B 2219/25314; G05B 2219/33105; H01Q 1/2208; H04Q 2209/47; F16K 31/0675; F16K 37/0041; F16K 31/406
See application file for complete search history.

(56) References Cited

U.S. PATENT DOCUMENTS

| | | | | |
|---|---|---|---|---|
| 6,272,321 B1* | 8/2001 | Bruhnke | ............... | G06K 7/0008 455/196.1 |
| 2003/0183226 A1* | 10/2003 | Brand | ................. | A61M 16/161 128/200.23 |
| 2008/0001752 A1* | 1/2008 | Bruns | ..................... | G06Q 10/08 340/572.1 |
| 2008/0217408 A1* | 9/2008 | Calvet | .................. | G06K 7/0008 235/492 |
| 2008/0265190 A1* | 10/2008 | Fleischer | ........... | G05D 16/2024 251/65 |
| 2008/0309497 A1* | 12/2008 | Bryant | ............. | G06K 19/07749 340/572.8 |
| 2009/0009297 A1* | 1/2009 | Shinohara | ................ | H04Q 9/00 340/10.4 |
| 2009/0096587 A1* | 4/2009 | Finkenzeller | ........ | G06K 7/0008 340/10.34 |

(Continued)

FOREIGN PATENT DOCUMENTS

WO 2009118018 A1 10/2009

*Primary Examiner* — Adnan Aziz
(74) *Attorney, Agent, or Firm* — The Webb Law Firm

(57) ABSTRACT

A solenoid valve has an electromagnet with a coil, an RFID tag for identifying the solenoid valve, and an antenna for unidirectional or bidirectional communication with the RFID tag. The antenna is the coil of the electromagnet. Using the coil of an electromagnet for communication with an RFID tag permits inexpensive quality assurance when using solenoid valves, in particular in blow moulding machines.

18 Claims, 5 Drawing Sheets

(56) References Cited

U.S. PATENT DOCUMENTS

| | | | |
|---|---|---|---|
| 2009/0309054 A1* | 12/2009 | Haller | F16K 31/0675 251/129.15 |
| 2012/0059511 A1* | 3/2012 | Majer | G07F 9/001 700/231 |
| 2013/0204202 A1* | 8/2013 | Trombly | A61M 5/16877 604/207 |
| 2014/0110613 A1 | 4/2014 | Pitchford et al. | |
| 2015/0041555 A1* | 2/2015 | Ahmadi | H05K 3/0085 239/71 |
| 2015/0184771 A1* | 7/2015 | Chen | F16K 31/0644 251/30.01 |
| 2015/0340183 A1* | 11/2015 | Ko | B60T 13/662 361/160 |
| 2016/0332357 A1* | 11/2016 | Gendre | B29C 49/36 |
| 2019/0151879 A1* | 5/2019 | Cortland | G06K 19/0723 |
| 2019/0271681 A1 | 9/2019 | Mckirdy | |

* cited by examiner

SOLENOID VALVE

CROSS REFERENCE TO RELATED APPLICATION

This application claims priority to European Patent Application No. 22161193.2, filed Mar. 9, 2022, the disclosure of which is hereby incorporated by reference in its entirety.

BACKGROUND OF THE INVENTION

Field of the Invention

The present invention relates to a solenoid valve, to a solenoid valve unit, and to a method for identifying a solenoid valve, in particular a solenoid valve used in blow moulding processes.

Description of Related Art

Owing to their electromagnet, solenoid valves are able to switch quickly. Direct-controlled valves use the electromagnet to drive the piston. Pilot-controlled or pressure-controlled valves use a pressure difference of the process pressure for opening and closing, wherein the electromagnet makes the pressure difference possible.

Pilot valves are solenoid valves which control the pressure difference of a main valve. They allow the main valves to switch quickly. They are small and inexpensive and can easily be replaced.

Such pilot valves and main valves are used, for example, in blowing devices or blowing machines for moulding hollow bodies, in particular in stretch blow moulding machines. In blow moulding, a preheated preform of a thermoplastic plastic, preferably of polyethylene terephthalate (PET), is connected to a blowing nozzle of the blowing machine. By blowing in a process gas, preferably compressed air, the preform is dilated. By using blow moulding, the desired shape can be achieved. Depending on the method, only blowing is carried out, or the blank, that is to say the preform, is additionally stretched by means of a displaceable mandrel or a displaceable stretch rod during blowing. This second method is called stretch blow moulding.

The process gas is conventionally blown in over two or more stages. Preblowing takes place at a lower pressure than subsequent main blowing. During the removal of air from the hollow body after the blowing process, the process gas, in particular compressed air, is recovered and/or guided to the outside.

The individual blowing steps and also the removal of air are controlled by means of valves. The production or moulding of such hollow bodies by means of blowing machines takes place within a few seconds, preferably within from 1 to 3 s. The valves must be able to switch correspondingly quickly and precisely.

High requirements are thus made of the pilot valves or of the solenoid valves. Such valves must meet high quality demands. In addition, they are subject to ageing and must regularly be replaced. Defective solenoid valves lead to faulty production, which increases the overall production costs. The large number of solenoid valves also has the result that their use constitutes a relevant cost factor of the production process.

In the prior art, RFID systems, which serve to identify objects (RFID=radio-frequency identification), are known. An object to be identified is provided with an RFID transponder, which is also called an RFID tag. Each RFID tag has an identifying code, which can be read by a reader of the RFID system. The identifying code will be called an identification code hereinbelow.

RFID tags have a microchip with a memory, and an antenna. Owing to the ID code, each object can thus be provided with an individual signature or identifier, so that it can be identified as an individual by a reader. RFID tags can be very small. Depending on the design, they require their own energy store, or they are supplied from the radio signals of the reader. RFID technology is well known and will therefore not be described further hereinbelow.

Inexpensive RFID tags usually have a short range of a few centimetres. For larger ranges, the RFID tag must have its own power supply, that is to say be in the form of an active RFID transponder. However, this increases the size of the structural form and also the costs considerably.

In order to unambiguously associate an RFID tag with an object, a dedicated antenna for communication with that RFID tag is usually used. The large number of antennae required for multiple RFID tags therefore increases the costs.

SUMMARY OF THE INVENTION

Accordingly, an object of the invention is to ensure that the replacement of solenoid valves of a machine, in particular of a blow moulding machine, can be carried out as inexpensively as possible without adversely affecting the quality of the operating behaviour of the machine.

The solenoid valve according to the invention has an electromagnet with a coil, an RFID tag for identifying the solenoid valve, and an antenna for unidirectional or bidirectional communication with the RFID tag. The antenna is the coil of the electromagnet.

By using the coil of the electromagnet as the antenna, it is possible to unambiguously associate the RFID tag with the valve without incurring costs for a dedicated antenna.

One-way or unidirectional communication substantially comprises reading an RFID tag, two-way or bidirectional communication also includes writing to the RFID tag. If the antenna also serves to supply power, this is also included in the one- and two-way communication.

The electromagnet of the solenoid valve usually has the coil, in which a magnetic field forms as a result of an electric current so that an armature or piston is moved.

The solenoid valve can thus be provided with an RFID tag for individual identification, wherein an inexpensive RFID tag with a low range can be used. The solenoid valve can still be produced inexpensively. This is advantageous in particular for pilot valves of blow moulding machines.

Because the coil of the electromagnet forms the transmitting antenna, the reader can be arranged at a large distance, preferably at any desired distance, from the solenoid valve. The receiving antenna of the RFID tag, owing to the joint arrangement in the solenoid valve, is always located in the immediate vicinity of the transmitting antenna and is unambiguously associated therewith.

On the one hand, it can thus be determined whether the replacement part is an original solenoid valve from the original manufacturer or is a copy. In this way, it can be ensured that the machine, in particular the blow moulding machine, is provided only with solenoid valves that meet the quality requirements.

If the machine malfunctions, it can additionally be determined which series of solenoid valves has caused a fault.

The manufacturer can then promptly recall further solenoid valves of the same production series.

Furthermore, the operating parameters of the valve can be set optimally in accordance with the identification code of the solenoid valve. For example, in a blow moulding machine, the boost and holding current can correspondingly be adjusted.

It is further advantageous that a switching cycle counter of the machine controller no longer has to be manually set to "zero" when the solenoid valve is changed. When the valve is changed, the machine controller, owing to the changing identification code, can automatically recognize that a new count is beginning. This simplifies maintenance and reduces errors by the maintenance personnel.

If, because of the absence of an RFID tag or owing to an incorrect identification code of a solenoid valve, a machine identifies that the solenoid valve is a third-party product and not an original product, the controller of the machine, depending on the design, can prohibit operation. Alternatively, it can set the operating parameters such that an operation that as far as possible meets the quality requirements is still ensured. For example, in the case of a blow moulding machine, the boost current can be reduced in order to prevent overloading of the valve, and/or the holding current of the valve can be increased in order to ensure a sufficiently high holding current.

The identification code, that is to say the ID of the RFID tag, is preferably stored in signed form, so as to avoid plagiarism. Data of the RFID tag are preferably protected by a signature based on the serial number of the RFID tag. The serial number is programmed in the RFID tag and cannot be changed. It is preferably encrypted by means of an algorithm and stored in the form of a signature in the memory of the RFID tag, preferably in the modifiable memory region of the RFID tag. Further data are preferably stored together with the signature. This ensures that the data, should they be copied from one RFID tag to another, lose their validity.

Data can be stored before and/or during use of the valve in a device. For example, specific characteristic data and/or process-dependent data can be stored on the RFID tag by the manufacturer. Storage can take place after the RFID tag has been connected to the valve or beforehand.

The RFID tag is preferably a passive transponder. The coil of the solenoid valve acting as the antenna is preferably used for supplying power. This reduces the costs and minimizes the size of the RFID tag.

The RFID tag preferably has a memory which is readable and writable by means of the antenna. In this way, when the solenoid valve is used in a machine, new information can be stored on the RFID tag. Such information is, for example, the number of switching cycles and/or the operating parameters of the solenoid valve. These data can be used, for example, to subsequently optimize the control of the solenoid valve. Because the number of switching operations is stored, the solenoid valve can be replaced at a specific individual time. Maintenance or the replacement of the solenoid valve can thus take place at as late a time as possible and nevertheless be preventative. This increases the period of use and minimizes the process costs.

In preferred embodiments, the RFID tag is arranged on or in the housing of the solenoid valve. The RFID tag is preferably adhesively bonded to the housing or inserted in an opening of the housing and adhesively bonded therein or fixed therein in another way. This has the advantage that the housing of the solenoid valve and the solenoid valve do not themselves have to be modified. Solenoid valves that are already present can be provided with an RFID tag, and the coil that is already present of the electromagnet can be used as the transmitting antenna.

The RFID tag is preferably disc-shaped or rod-shaped.

The idea according to the invention can be implemented for different solenoid valves of known type. The solenoid valve is preferably a pilot valve for controlling a piston valve, more preferably a pilot valve of a blow moulding device.

The solenoid valve unit according to the invention has a solenoid valve as described above and a control apparatus. The control apparatus has a circuit with an RFID driver, wherein the circuit has a frequency adaption for adjusting a frequency of an oscillating circuit of the coil of the electromagnet to an RFID standard frequency.

RFID standard frequencies are the frequencies specified in the rules that are applicable for a particular country, for example the international standards according to ISO, the European standards according to EPC Global and the American standards according to ANSI. RFID standard frequencies permit compatibility between different products.

The coil can thus be used with an optimal voltage (AC or DC) for driving the valve armature. The valve armature is preferably the valve piston. Owing to the frequency adaption, it is possible to adjust the oscillating frequency to standard values of the RFID system. In this way, known solenoid valves, the original resonant frequency of which is outside the usual RFID frequencies, can easily be incorporated into an RFID system and their coil can nevertheless easily be used as the transmitting antenna for communication with the RFID tag.

The resonant frequency of an oscillating circuit of a solenoid valve of a blow moulding machine is usually in the range of about 100 kHz. One of the lowest RFID standard frequencies is 125 kHz. The frequency adaption preferably serves to increase the frequency of the oscillating circuit of the coil. The frequency of the oscillating circuit of the coil can preferably be adjusted to at least 125 kHz.

The frequency adaption is preferably part of a parallel oscillating circuit. The frequency adaption, in particular the parallel oscillating circuit, can be arranged at different locations of the apparatus. It is preferably located in a control unit of a solenoid valve controller, preferably in a control box. Depending on the design, the solenoid valve controller controls only one solenoid valve or a plurality of solenoid valves, in order purposively to actuate them, that is to say open or close them, at the same time or at different times.

In other embodiments, the frequency adaption is located in the solenoid valve or in a plug of a cable connection between a reading unit of the RFID system and the solenoid valve.

In this embodiment, but also in all other embodiments, the reading unit of the RFID system can be a separate component of the machine or it can be integrated in the control unit, in particular in the control box, for actuating the solenoid valve.

In preferred embodiments, there is a control apparatus which controls the RFID system and also the actuation of the valve. In preferred embodiments, the control apparatus therefore further has a valve driver for actuating the solenoid valve, and also a changeover element, wherein the changeover element makes it possible that either the valve driver actuates the solenoid valve or the RFID driver activates the antenna.

In the method according to the invention for identifying the above-described solenoid valve, the coil of the electromagnet of the solenoid valve is used as the antenna for communication with the RFID tag of the solenoid valve.

The RFID tag is preferably interrogated at least after each restart of the machine.

Communication with the RFID tag preferably takes place in the breaks between the actuations of the solenoid valve. In this way, actuation of the valve is not adversely affected by operations of reading or writing to the RFID tag. This also makes it possible to use a distinct frequency for the operations of reading and/or writing to the RFID tag.

A frequency of an oscillating circuit of the solenoid valve is preferably increased for the purpose of communication with the RFID tag.

In a simple variant of the method, the identification code of the RFID tag is merely read in order to identify the solenoid valve. In further simple variants, it is decided on the basis of the identification code whether the machine is set in operation or not.

In other variants, the control parameters for controlling the opening and closing of the solenoid valve are adjusted in accordance with information on the RFID tag. In further variants, in addition or alternatively to the adjustment of the control parameters, information on switching cycles which have taken place and/or information relating to switching parameters which have been used is stored on the RFID tag. This information can, for example, then be evaluated by the machine controller and used for further operation of the machine and/or for issuing a notification when the solenoid valve must be replaced or maintained.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DETAILED DESCRIPTION

Figure 1:
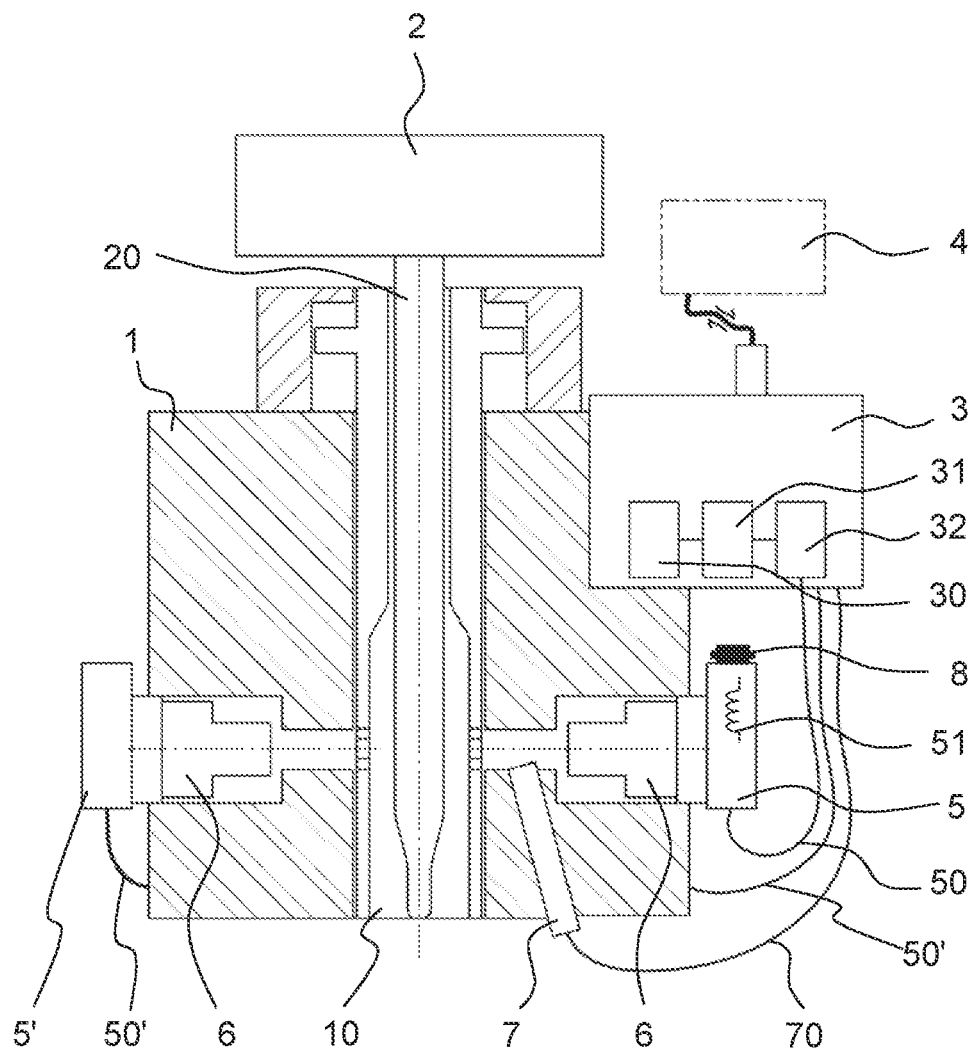
FIG. 1 shows a schematic representation of a housing block with process valves of a blow moulding machine having a solenoid valve unit according to the invention.

FIG. 1 shows a preferred field of application of the solenoid valve 5 according to the invention. It is a housing block 1 of a blow moulding machine. The housing block 1 has a through-bore 10, through which there passes a stretch mandrel 20 which is connected to a stretch mandrel apparatus 2. A blank of a body, in particular of a PET bottle, that is to be blown can be arranged at or in the through-bore 10. Such blow moulding machines are largely known in the prior art and will therefore not be described further.

They have, as mentioned at the beginning, a plurality of valves which are actuated at different times in the course of the blowing process in order to bring the blank into the desired shape by means of blown air. In this view, two valves are shown. They each comprise a pilot valve 5, 5' in the form of a solenoid valve and also a main valve 6 in the form of a pneumatic piston valve.

For measuring the blowing pressure in the housing block 1 there is usually a pressure sensor, which is provided with reference sign 7 in FIG. 1.

A control apparatus 3 is connected by way of a first connecting line 50 to a first pilot valve 5 and by way of a second connecting line 50' to a second pilot valve 5'. The valves can be identical and serve the same purpose, or there can be different valves. Preferably, more than these two valves are present.

An RFID tag 8 is attached to the first pilot valve 5 but not to the second pilot valve 5'. Depending on the embodiment, all the pilot valves 5 are provided with RFID tags 8, or only some of them. However, it is recommended to provide all the solenoid valves 5, 5' with such RFID tags 8 in order to ensure optimal quality assurance.

A third connecting line 70 connects the control apparatus 3 to the pressure sensor 7.

The control unit 3 is further connected to a machine controller 4. The control unit 3 preferably forms a unit that is separate from the machine controller 4. It can, however, also be part of the machine controller 4.

The control apparatus 3 has a control logic 30, an RFID driver 31 and a frequency adaption 32.

Figure 2:
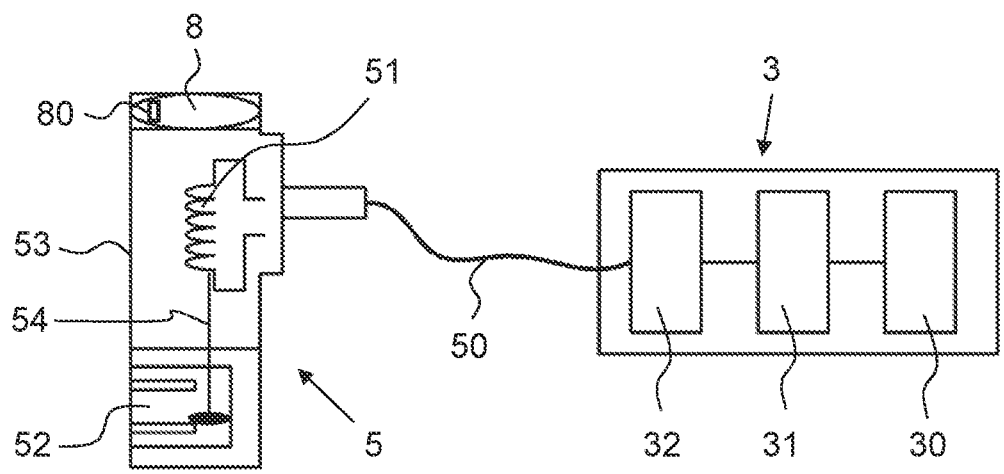
FIG. 2 shows a schematic representation of a solenoid valve unit according to the invention having a solenoid valve according to the invention according to a first embodiment.

FIG. 2 shows a solenoid valve unit according to the invention, which has the control apparatus 3, the connecting line 50, the pilot valve 5 and an RFID tag 8 attached to the pilot valve 5.

The pilot valve 5 has a magnetic coil or coil 51 and a pneumatic part 52. By activation of the magnetic coil, an armature 54, which opens or closes at least one channel in the pneumatic part 52, is moved. The control medium for pneumatically controlling the main valve 6, to which a process pressure is applied, flows through this at least one channel. Such pilot valves are known in the prior art and will therefore not be explained further.

In this example, the RFID tag 8 is fastened, for example adhesively bonded, to the housing 53 of the pilot valve 5. It is preferably disc-shaped. It is preferably situated in the region adjacent to the coil 51 of the pilot valve 5. The distance is such that communication between the coil 51 of the pilot valve and an antenna of the RFID tag 8 can take place. The antenna of the RFID tag 8 is usually likewise a coil.

Figure 3:
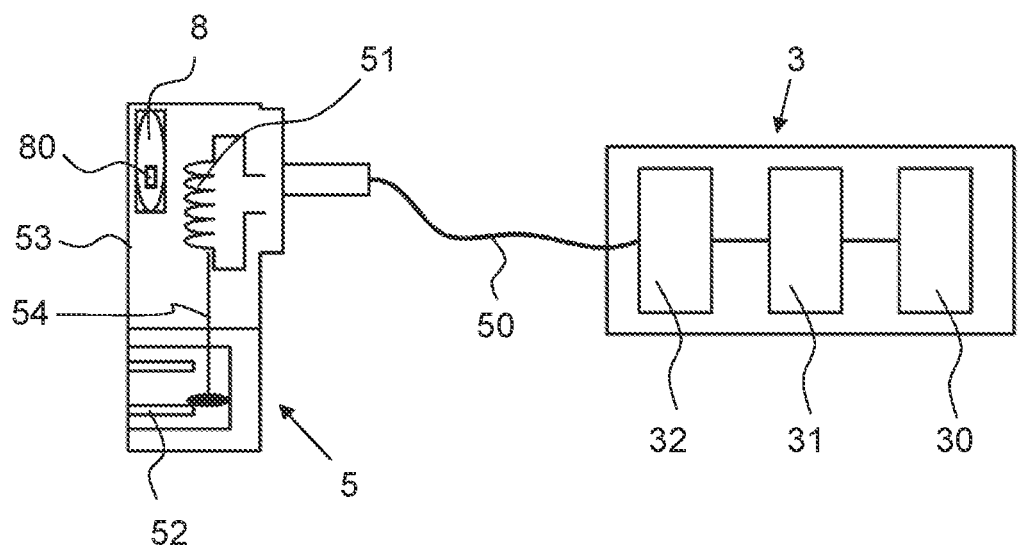
FIG. 3 shows a schematic representation of a solenoid valve unit according to the invention having a solenoid valve according to the invention according to a second embodiment.

In the embodiment according to FIG. 3, the RFID tag 8 is rod-shaped. It is fastened, preferably adhesively bonded, in a bore in the housing 53 of the pilot valve 5. It is again situated adjacent to the coil 51 of the pilot valve 5, and communication between the two antennae is again possible. The antenna of the RFID tag 8 is again preferably a coil. This applies also to other forms of RFID tag.

Figure 4:
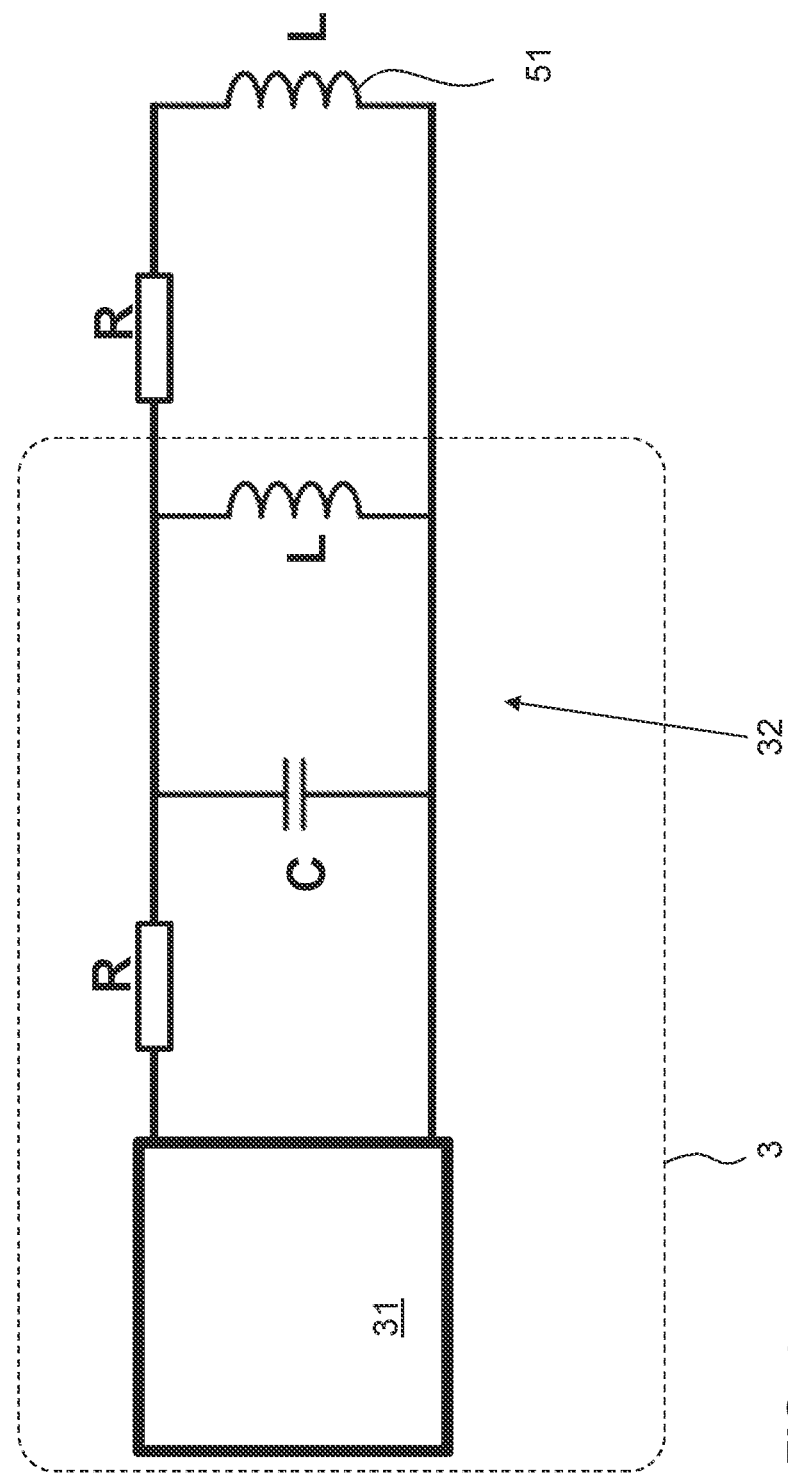
FIG. 4 shows a schematic representation of an oscillating circuit with a frequency adaption.

The control unit 3 has an oscillating circuit with a frequency adaption 32, as can readily be seen in FIG. 4. The RFID driver 31 is connected to the coil 51 of the pilot valve 5. The frequency adaption 32 comprises a capacitor C and a further coil L. Resistors R are correspondingly arranged in the oscillating circuit. The frequency adaption allows the usual frequency for the coil 51 of the pilot valve 5 to be changed. The frequency is preferably changed to an RFID standard frequency, usually increased to such a frequency.

The coil 51 of the pilot valve 5 is preferably used on the one hand as an antenna for reading or writing to the RFID tag 8 and on the other hand to generate the magnetic field for moving the armature 54 or piston of the solenoid valve and thus for opening and/or closing the solenoid valve. These two functions are performed alternately.

Figure 5:
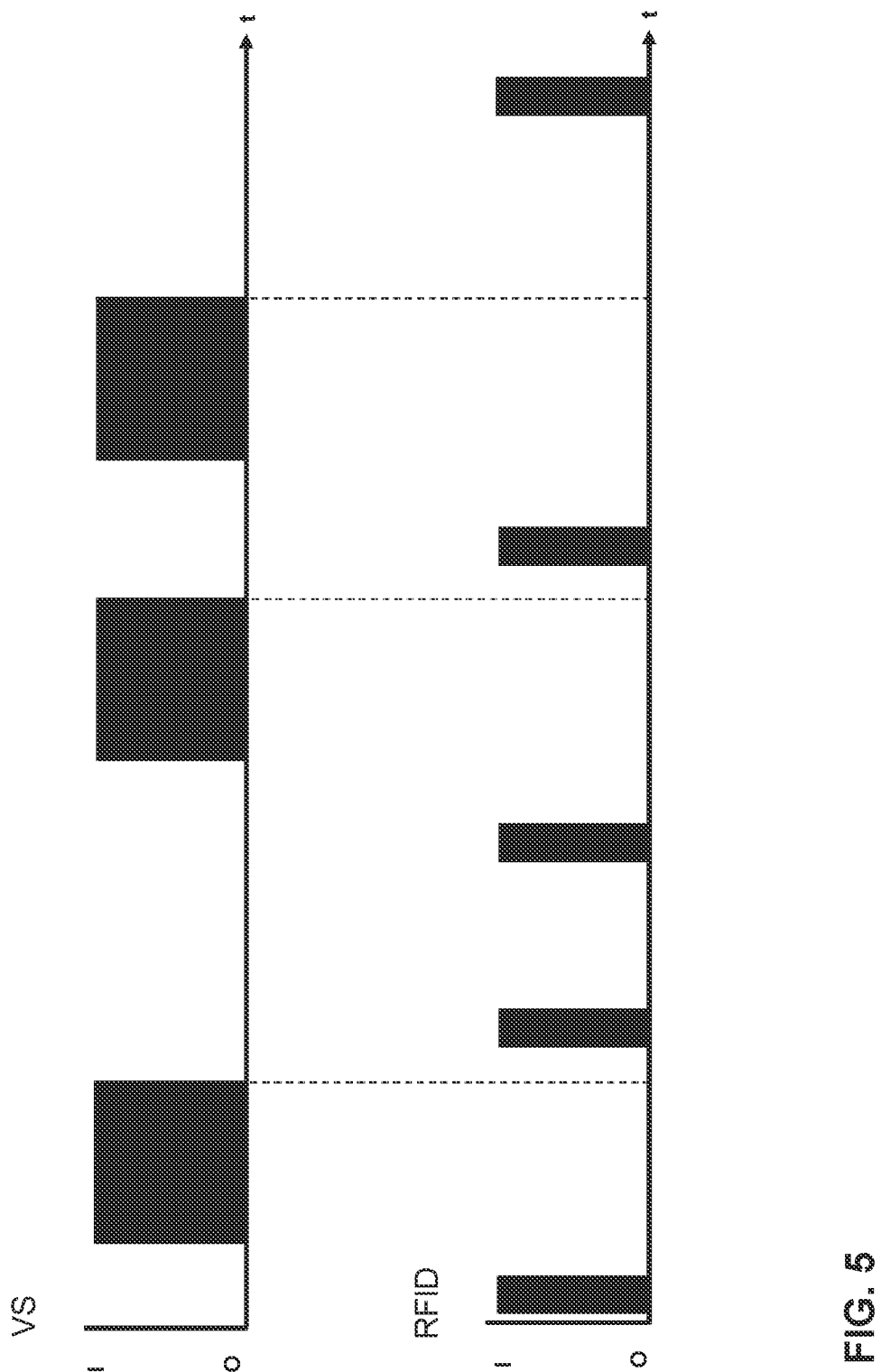
FIG. 5 shows a graphic representation of the actuation of the valve and of the RFID communication as a function of time.

This can be seen in FIG. 5. The top graph shows the valve control VS, wherein the current I flowing through the coil is shown as a function of the time t. The black blocks each show the time segments in which the current flows through the coil and attracts the armature, whereby the valve is actuated and thus switched on.

The bottom graph shows the RFID communication between the coil 51 of the valve 5 and the RFID tag 8. The time segments are the same as in the top graph. The black blocks show the regions in which the RFID tag 8 is being read and/or written to. It can clearly be seen in FIG. 5 that the RFID system is active only when the solenoid valve 5 is not actuated.

The representation in FIG. 5 is purely schematic. The RFID tag is preferably interrogated each time the machine is restarted. After how many cycles the RFID tag 8 is read and/or written to then depends on the type of valve and/or on the type of quality assurance that is desired and/or on the type of machine controller or solenoid valve controller. For example, the RFID system is activated only after every tenth switching cycle of the valve or after every hundredth cycle or another integer multiple of cycles. In preferred embodiments, communication can always take place, except when the solenoid valve is actuated.

Figure 6:
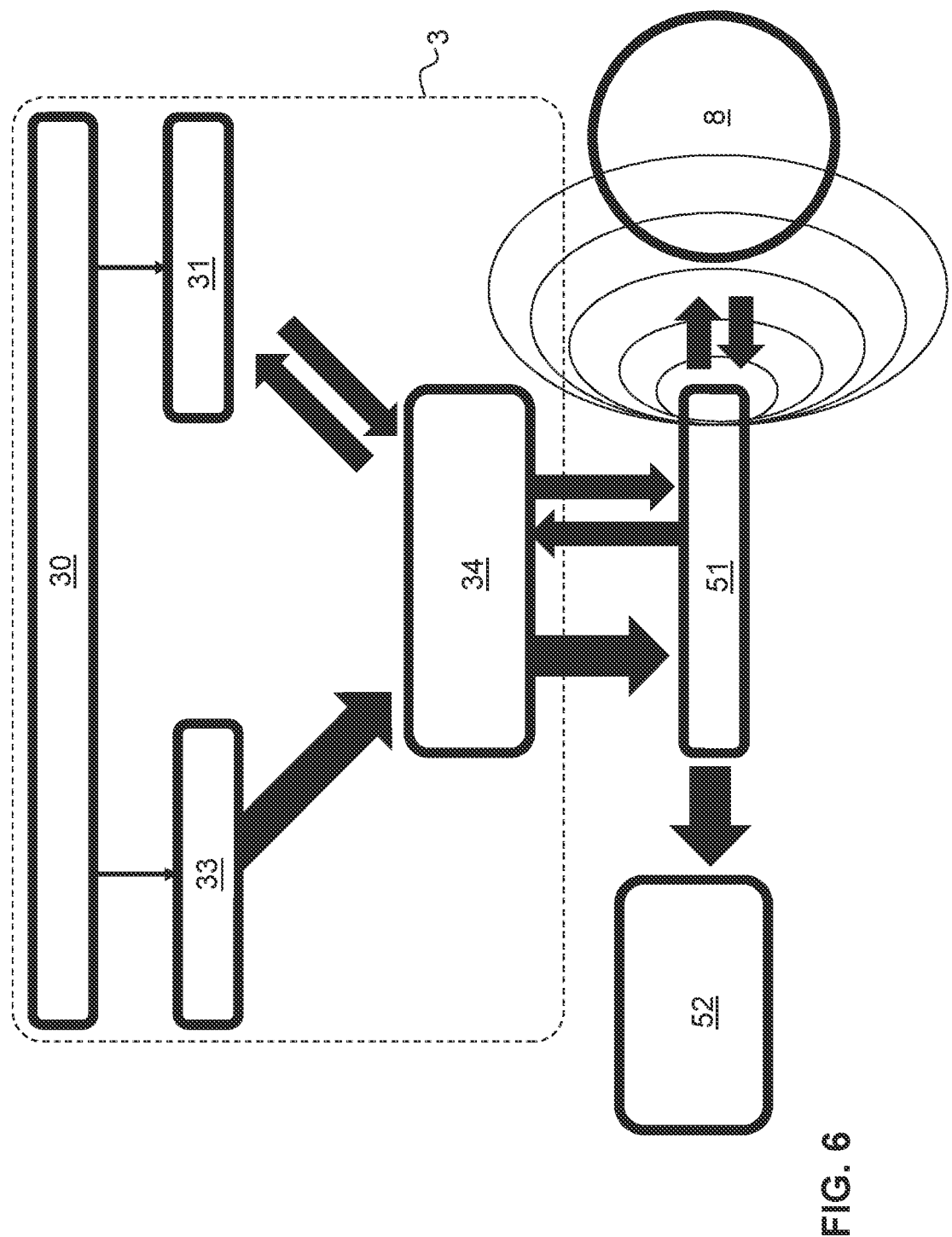
FIG. 6 shows a schematic representation of the control of the solenoid valve and of the RFID communication.

FIG. 6 shows the corresponding controller in a schematic representation. The control logic 30 of the control apparatus 3 or a superordinate control logic activates either a valve driver 33 for actuating the solenoid valve 5 or the RFID driver 31 for communication with the RFID tag 8. A changeover element 34, which also contains the frequency adaption 32, is correspondingly actuated. In a first setting of the changeover element 34, the coil 51 of the solenoid valve 5 generates a magnetic field for actuating the armature 54 or the piston of the valve, wherein the armature 54 or the piston influences the pneumatic part 52 of the magnet. In a second setting of the changeover element 34, the coil 51 acts as an antenna. Usually, it generates in this case a high-frequency electromagnetic alternating field, which supplies power to the passive RFID tag 8 and which is influenced by the RFID tag 8 for the purpose of data transmission.

The broad arrows in FIG. 6 show the first setting, in which the solenoid valve 5 is actuated. The narrow arrows and the circular thin lines show the second setting, in which the RFID system is active.

The above-mentioned configuration and the mentioned methods can likewise be applied to other types of solenoid valve. They are not limited to pilot valves.

The use according to the invention of the coil of a solenoid valve for communication with an RFID tag permits inexpensive quality assurance when using solenoid valves, in particular in blow moulding machines.

The invention claimed is:

1. A solenoid valve comprising:
   an electromagnet with a coil,
   an RFID tag for identifying the solenoid valve, the RFID tag comprising a first antenna, and a second antenna for unidirectional or bidirectional communication with the first antenna of the RFID tag,
   wherein the second antenna is the coil of the solenoid valve.

2. The solenoid valve according to claim 1, wherein the RFID tag is a passive transponder.

3. The solenoid valve according to claim 1, wherein the RFID tag has a memory which is readable and writable by means of the second antenna.

4. The solenoid valve according to claim 1, wherein the solenoid valve has a housing and wherein the RFID tag is arranged on or in the housing.

5. The solenoid valve according to claim 1, wherein the solenoid valve is a pilot valve for controlling a piston valve.

6. The solenoid valve according to claim 1, wherein the solenoid valve is a valve of a blow moulding device.

7. A solenoid valve unit having at least one solenoid valve according to claim 1 and a control apparatus, wherein the control apparatus has a circuit with an RFID driver and wherein the circuit has a frequency adaption for adjusting a frequency of an oscillating circuit of the coil to an RFID standard frequency.

8. The solenoid valve unit according to claim 7, wherein the frequency adaption serves to increase the frequency of the oscillating circuit of the coil.

9. The solenoid valve according to claim 1, wherein data of the RFID tag are protected by a signature based on a serial number of the RFID tag.

10. The solenoid valve unit according to claim 7, wherein the control apparatus further has a valve driver for actuating the solenoid valve, and also a changeover element, wherein the changeover element makes it possible that either the valve driver actuates the solenoid valve or the RFID driver activates the second antenna.

11. A method for identifying a solenoid valve, the solenoid valve comprising:
    an electromagnet with a coil,
    an RFID tag for identifying the solenoid valve, the RFID tag comprising a first antenna, and
    a second antenna for unidirectional or bidirectional communication with the first antenna of the RFID tag,
    the method comprising using the coil of the electromagnet of the solenoid valve as the second antenna for communication with the first antenna of the RFID tag of the solenoid valve.

12. The method according to claim 11, wherein communication with the RFID tag takes place in the breaks between the actuations of the solenoid valve.

13. The method according to claim 11, wherein a frequency of an oscillating circuit of the solenoid valve is increased for the purpose of communication with the RFID tag.

14. The method according to claim 11, wherein control parameters for actuation of the solenoid valve are adjusted in accordance with information on the RFID tag.

15. The method according claim 11, wherein information on switching cycles which have taken place and/or information relating to switching parameters which have been used is stored on the RFID tag.

16. The method according to claim 12, wherein a frequency of an oscillating circuit of the solenoid valve is increased for the purpose of communication with the RFID tag.

17. The method according to claim 12, wherein control parameters for actuation of the solenoid valve are adjusted in accordance with information on the RFID tag.

18. The method according to claim 12, wherein information on switching cycles which have taken place and/or information relating to switching parameters which have been used is stored on the RFID tag.

\* \* \* \* \*